C. S. CRAWFORD.
CUSPIDOR AND THE LIKE.
APPLICATION FILED MAR. 15, 1910.
1,008,958.
Patented Nov. 14, 1911.
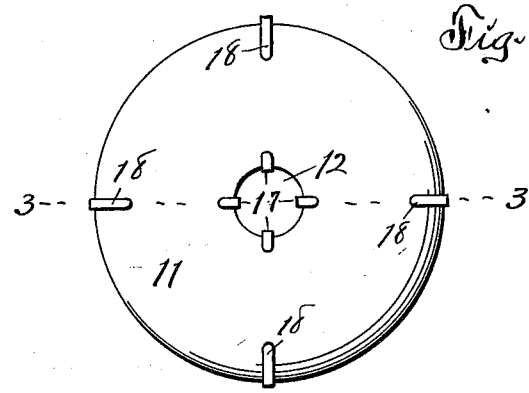
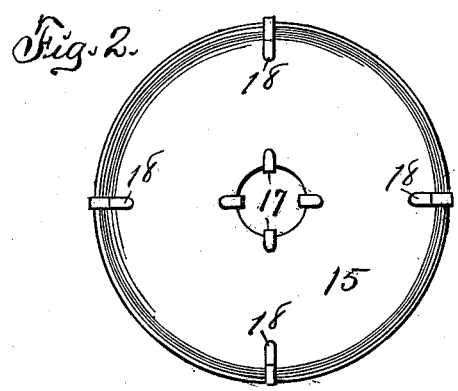
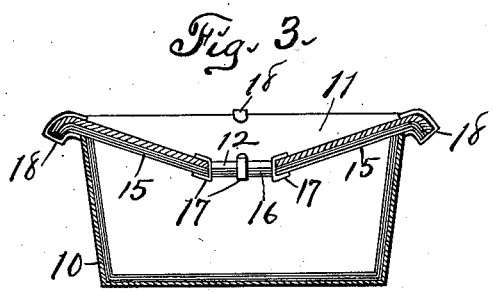

UNITED STATES PATENT OFFICE.

CHARLEY S. CRAWFORD, OF WINTERSET, IOWA.

CUSPIDOR AND THE LIKE.

1,008,958.  Specification of Letters Patent.  Patented Nov. 14, 1911.

Application filed March 15, 1910. Serial No. 549,560.

*To all whom it may concern:*

Be it known that I, CHARLEY S. CRAWFORD, a citizen of the United States of America, and resident of Winterset, Madison county, Iowa, have invented a new and useful Cuspidor and the Like, of which the following is a specification.

The object of this invention is to provide improved means for overcoming objectionable features of cuspidors, commodes and containing vessels of like character.

My invention consists in the construction, arrangement and combination of elements hereinafter set forth, pointed out in my claim and illustrated by the accompanying drawings, in which—

Figure 1 is a plan of one form of cuspidor or containing vessel equipped with my improvement. Fig. 2 is a bottom plan of the cover of said receptacle. Fig. 3 is a cross-section on the indicated line 3—3 of Fig. 1.

In the construction of the device as shown the numeral 10 designates an open topped receptacle, such as the bowl of an ordinary two-piece cuspidor. The receptacle 10 is provided with a cover 11 of hopper construction or shape having an opening 12 in its center and a downturned rim 13. The bowl and cover are of common shape and construction. A plurality of cups 14 are nested within each other and within the receptacle 10 and are fitted closely to the inner surfaces of the wall and bottom thereof. A series of protecting plates 15 are nested relative to each other and to the bottom surface of the cover 11. The protecting plates are formed with central holes 16 registering with each other and with the hole 12 of the cover. The protecting plates 15 are formed with downturned rim portions conforming in shape to the rim portion 13 of the cover and adapted to rest on the upper margin of the receptacle or bowl 10 and the upper margins of the cups 14. The plurality of protecting plates 15 are conjunctively held contiguous to the bottom of the cover 11 by spring clips 17 embracing and engaging the inner margins thereof and by spring clips 18 embracing and engaging the rim portions thereof. The cups 14 preferably are circular and tapering slightly from top to bottom.

In practical use the bowl or receptacle 10 is lined with a plurality of the nested cups 14 and the cover 11 is lined on its bottom by a plurality of the protecting plates 15. Any substance designed to be contained in the receptacle 10 may be introduced through the openings 12, 16 directly, or flow through said openings from the upper surface of the cover 11 and be received by the innermost cup 14, and any portion of such substance that may be splashed upwardly will be received by the lowermost protecting plate 15. The receptacle may be cleansed by washing the upper surface of the cover 11; then removing said cover from the bowl and removing the lowermost protecting plate 15 from the cover, preferably by tearing it away from the spring clips 17, 18; and then removing the innermost cup 14 with its contents. The soiled and removed portions of the linings may be disposed of in any desired manner, such as by incineration. The cover is then replaced as shown and the receptacle in its entirety presents a proper appearance and sanitary condition for continued use. The linings may be of any desired material but I prefer to employ glazed or waterproof paper that is impervious to moisture.

Other forms and shapes and combinations may be employed without departing from the spirit of my invention and I do not limit myself to the precise construction and arrangement as shown.

I claim as my invention—

A receptacle of the class described, comprising a bowl, fitted, nested linings in said bowl, each lining being independent of each other and of the bowl, an apertured cover, apertured, fitted, nested linings on the lower surface of said cover, said fitted, nested linings and cover formed with concentrically curved rims superposed on the rim portions of the bowl and linings in said bowl, and spring clips embracing the outer and inner marginal portions of the cover and cover linings.

Signed by me at Winterset, Iowa, this eighth day of March, 1909.

CHARLEY S. CRAWFORD.

Witnesses:
 GEORGE HILL,
 H. M. RAUSENBERGER.

Copies of this patent may be obtained for five cents each, by addressing the "Commissioner of Patents, Washington, D. C."